Figure 1:
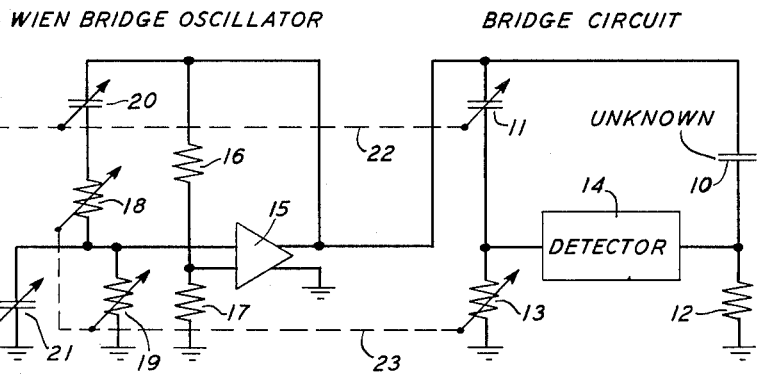

June 21, 1966

B. McKIM 3,257,611

ELECTRICAL IMPEDANCE MEASURING BRIDGE CIRCUITS HAVING
SUBSTANTIALLY MAXIMUM BRIDGE SENSITIVITIES
WHEN APPROACHING BALANCE

Filed Dec. 5, 1962

2 Sheets-Sheet 1

INVENTOR
B. McKIM
BY
*H. Logan*
ATTORNEY

United States Patent Office 3,257,611
Patented June 21, 1966

3,257,611
ELECTRICAL IMPEDANCE MEASURING BRIDGE CIRCUITS HAVING SUBSTANTIALLY MAXIMUM BRIDGE SENSITIVITIES WHEN APPROACHING BALANCE
Burton McKim, Morris Township, Morris County, N.J., assignor to Bell Telephone Laboratories Incorporated, New York, N.Y., a corporation of New York
Filed Dec. 5, 1962, Ser. No. 242,392
15 Claims. (Cl. 324—57)

This invention relates to electrical impedance-measuring bridge circuits and in particular to alternating current bridge circuits having substantially maximum sensitivity in the detector branches.

A popular procedure for measuring capacitance and inductance involves using a four-arm alternating current bridge circuit having similar reactive elements in two adjacent arms and resistive elements in the other two arms. When the reactive elements comprise capacitors having relatively small resistive and inductive impedance components, it is a general practice to neglect these components as their effects are negligible. Similarly, when the reactive elements comprise inductors having relatively small resistive and capacitive impedance components, it is a general practice to neglect these components. In the following discussion, such impedance components are considered to be small enough to be neglected.

In bridge circuits of the above-described type there is a particular frequency of the bridge energizing signal which produces a maximum detector signal for each unbalanced condition. In other words, there is a frequency which makes the bridge more sensitive than with any other frequency. This phenomenon is not, however, always used to advantage. In particular, because of the time and effort required to optimize the frequency of the energizing signal, it is a general practice to use a fixed frequency energizing signal and to increase the sensitivity of the detector to compensate for the loss in bridge sensitivity. Such a procedure is not, however, always desirable for one or more reasons. The over-all sensitivity is not, for example, constant for different valued unknown elements.

An object of the present invention is to cause the frequency of a bridge energizing signal to change with changes in the values of one or more elements in the bridge circuit so that substantially maximum bridge sensitivity is provided as the bridge circuit is being balanced.

This and other objects are achieved in accordance with the invention in one of its broader aspects by electrical and mechanical interconnections between a bridge circuit and an oscillator supplying an energizing signal to the bridge circuit. As a result of these interconnections, the frequency of the oscillator is automatically changed as the bridge circuit is adjusted towards a balanced condition so that frequencies are produced which cause the bridge circuit to have substantially maximum sensitivity as it is being balanced.

Several embodiments of the invention take the form of a bridge circuit energized by a resistance-reactance tuned oscillator and mechanical couplings between elements in the bridge circuit and in the oscillator. The bridge circuit is of the four-arm type having resistive elements in two adjacent arms and reactive elements of the same type in the other arms. The oscillator, which may be of the Wien bridge type or the phase-shift type, has in its reactive-resistive frequency determining network reactive elements of the same type as in the bridge circuit. When using the Wien bridge oscillator, a first mechanical coupling interconnects the resistive elements in the oscillator frequency determining network and in only one of the bridge arms so that all resistive elements so interconnected have substantially the same value for each setting of the first mechanical coupling while a second mechanical coupling interconnects the reactive elements in the oscillator frequency determining network and in only one of the bridge arms so that all reactive elements so interconnected have substantially the same value for each setting of the second mechanical coupling. The bridge arms thus coupled to the oscillator are adjacent to one another and furthermore neither includes the element whose impedance is to be measured. Substantially the same arrangement is employed when using a phase-shift oscillator, the only difference being that for each setting of the coupling the product of the values of one of the network resistive elements and one of the network reactive elements and the product of the values of the bridge circuit element to which they are mechanically coupled are related to one another by a factor substantially equal to the square root of six. As explained in detail subsequently, for each unbalanced condition, the oscillator produces an energizing signal that causes the bridge circuit to have substantially maximum sensitivity.

Other objects and features of the invention will become apparent from a study of the following detailed descriptions of two specific embodiments.

In the drawings:
FIGS. 1 through 4 are schematic diagrams of specific embodiments of the invention, respectively.

The embodiment of FIG. 1 comprises a bridge circuit and a Wien bridge oscillator. A capacitor 10 of unknown value forms one arm of the bridge circuit while an adjustable capacitor 11 forms an adjacent arm. A fixed value resistor 12 forms an arm adjacent to that comprising capacitor 10 while an adjustable resistor 13 forms an arm between those comprising capacitor 11 and resistor 12, respectively. A detector 14 is connected between the junction of capacitor 11 and resistor 13 and the junction of capacitor 10 and resistor 12. The output of the Wien bridge oscillator is applied between the junction of capacitors 10 and 11 and the junction of resistors 12 and 13.

The Wien bridge oscillator is conventional. In particular, the output of an amplifier 15 is applied across a series combination of resistors 16 and 17. The junction of resistors 16 and 17 is connected to one input terminal of amplifier 15. The output of amplifier 15 is also applied across a combination of two adjustable resistors 18 and 19 and two adjustable capacitors 20 and 21. Capacitor 20 is connected in series with resistor 18 which in turn is connected in series with the parallel combination of resistor 19 and capacitor 21. The junction between resistor 18 and the parallel combination of resistor 19 and capacitor 21 is connected to the remaining input terminal of amplifier 15. The frequency of oscillation is determined by the frequency sensitive network comprising resistors 18 and 19 and capacitors 20 and 21.

A first mechanical coupler 22 interconnects capacitors 11, 20 and 21 so that all capacitors have substantially the same value for each setting of coupler 22. A second mechanical coupler 23 interconnects resistors 13, 18 and 19 so that all capacitors have substantially the same value for each setting of coupler 23. Coupler 22 changes capacitors 11, 20 and 21 in discrete steps for range adjustments while coupler 23 changes resistors 13, 18 and 19 in a continuous manner for in-range adjustments.

The theory of operation of the embodiment of FIG. 1 is now presented.

When the bridge circuit is in a balanced condition, the voltage across detector 14 is zero. The voltage from the junction of capacitor 10 and resistor 12 to ground is therefore equal to the voltage from the junction of capacitor 11 and resistor 13 to ground. When the value of a given unknown capacitor is represented by $C_{10}$ and the values of resistors 12 and 13 and capacitor 11 that produce a balanced condition are represented by $R_{12}$, $R_{13}$, and $C_{11}$, respectively, it is found by placing the junction voltage expressions equal to one another and solving that $(R_{13})(C_{11}) = (R_{12})(C_{10})$. From this is follows that an infinite number of combinations of values of resistors 12 and 13 and capacitor 11 provide a balanced condition for a given value of unknown capacitor 10. In the following discussion, the values $R_{12}$, $R_{13}$, $C_{10}$ and $C_{11}$ represent the values of these components for any balanced condition and are related in the above-defined manner.

When the bridge circuit is in an unbalanced condition, the optimum frequency for that unbalanced condition (that is, the one producing the maximum detector voltage) is found by equating the differentiation of the detector voltage expression to zero and solving for frequency. When, for example, a balanced condition is to be produced by charging resistor 13 only, then resistor 12 and capacitors 10 and 11 have values $R_{12}$, $C_{10}$ and $C_{11}$, respectively, while resistor 13 has a value equal to $(R_{13} \pm \Delta R_{13})$. The expression for the optimum frequency under these conditions is:

$$f = \frac{1}{2\pi C_{11}\sqrt{R_{13}(R_{13} \pm \Delta R_{13})}}$$

This expression is subsequently compared to the one for the frequency of the Wien bridge oscillator.

For substantially zero phase shift in amplifier 15, the Wien bridge oscillator oscillates at the frequency that produces a zero phase shift between the input and output of the network comprising resistors 18 and 19 and capacitors 20 and 21. The expression for frequency is therefore obtainable by writing the expression for the output of the network in terms of its input and solving for frequency when the phase shift through the network is set equal to zero. Because capacitors 20 and 21 have substantially the same values as capacitor 11 for all settings of coupler 22 while resistors 18 and 19 have substantially the same values as resistor 13 for all settings of coupler 23, the expression for the frequency when a balanced condition is to be produced in the bridge circuit by changing resistor 13 only is:

$$f = \frac{1}{2\pi C_{11}(R_{13} \pm \Delta R_{13})}$$

This may be rewritten in the following form which may be more easily comparable with the optimum frequency of the unbalanced bridge:

$$f = \frac{1}{2\pi C_{11}\sqrt{(R_{13} \pm \Delta R_{13})(R_{13} \pm \Delta R_{13})}}$$

The bridge circuit optimum frequency expression and the oscillator frequency expression differ from one another only in that in the former, one of the terms under the square root radical is $R_{13}$ while in the latter it is $(R_{13} \pm \Delta R_{13})$. The value $\Delta R_{13}$ is, however, small with respect to the value $R_{13}$. Furthermore, as a balanced condition of the bridge circuit is approached, the value $\Delta R_{13}$ becomes smaller so that the difference between the terms becomes smaller. The frequency of the oscillator therefore approaches the changing optimum frequency of the bridge circuit as a balanced condition is approached, thereby providing substantially maximum bridge circuit sensitivity.

Figure 2:
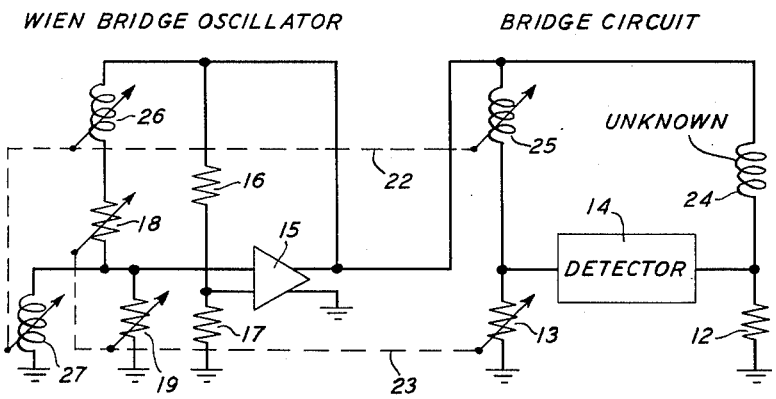

The embodiment of FIG. 2 is used for measuring inductors. This embodiment is similar in both structure and operation to that of FIG. 1. The elements in this embodiment which are identical to those of the embodiment of FIG. 1 have been identified by symbols used in FIG. 1. The only structural differences are that inductors 24, 25, 26 and 27 have replaced capacitors 10, 11, 20 and 21, respectively. In a manner similar to that discussed with respect to the embodiment of FIG. 1, when the values of inductors 24, 25 and resistors 12 and 13 are identified as $L_{24}$, $L_{25}$, $R_{12}$ and $R_{13}$, respectively, for a balanced condition, then these values are related in the following manner:

$$\frac{R_{12}}{L_{24}} = \frac{R_{13}}{L_{25}}$$

The expression for the optimum frequency of the bridge circuit is:

$$f = \frac{\sqrt{R_{13}(R_{13} \pm \Delta R_{13})}}{2\pi L_{25}}$$

The expression for the oscillator frequency is:

$$f = \frac{\sqrt{(R_{13} \pm \Delta R_{13})(R_{13} \pm \Delta R_{13})}}{2\pi L_{25}}$$

These expressions indicate that the frequency of the oscillator approaches the changing optimum frequency of the bridge circuit as a balanced condition is approached, thereby providing substantially maximum bridge sensitivity.

Figure 3:
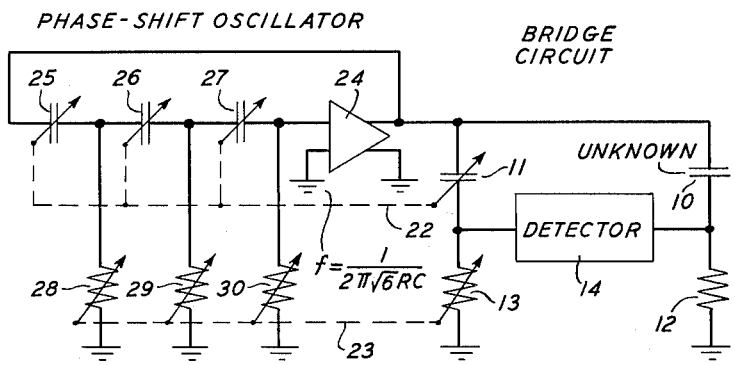
Figure 4:
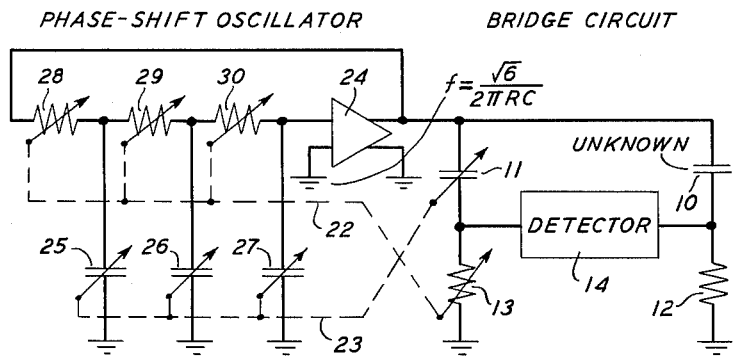

The embodiments of FIGS. 3 and 4 comprise conventional phase shift oscillators and bridge circuits. The embodiments differ from one another only in that the resistive and reactive elements in the frequency determining networks are in opposite locations with respect to one another. Because the oscillators are similar to one another, the oscillator elements in the embodiments are identified by the same symbols. In particular, the oscillators each comprise an amplifier 24 and a frequency determining network comprising capacitors 25, 26 and 27 and resistors 28, 29 and 30 connected between the output and input of amplifier 24. The bridge circuits are identical to the bridge circuit in the embodiment of FIG. 1 and consequently the symbols employed in FIG. 1 have been used in FIGS. 3 and 4.

Because of the identity of the bridge circuits in FIGS. 3 and 4 with that of FIG. 1, the expression for the optimum frequency, when a balanced condition is to be produced by changing resistor 13 only, is once again:

$$f = \frac{1}{2\pi C_{11}\sqrt{R_{13}(R_{13} \pm \Delta R_{13})}}$$

For substantially zero phase shifts in amplifiers 24, the phase-shift oscillators oscillate at frequencies that produce zero phase shifts between the inputs and outputs of the frequency determining networks. The expressions for frequency are therefore obtainable by writing the expressions for the outputs of the networks in terms of their inputs and solving for frequency for a zero phase shift through the networks. When the values of capacitors 25, 26 and 27 are equal to one another and the values of resistors 28, 29 and 30 are also equal to one another, the expression for the frequency of the oscillator of FIG. 3 is $$f = \frac{1}{2\pi\sqrt{6}RC}$$

while the expression for the frequency of the oscillator of FIG. 4 is $$f = \frac{\sqrt{6}}{2\pi RC}$$

where R and C are any values for the resistors and capacitors, respectively. In accordance with the present invention, the values of resistors 28, 29 and 30 are maintained substantially equal to one another while the values of capacitors 25, 26 and 27 are also maintained substantially equal to one another. These elements are chosen in the embodiment of FIG. 3 so that for each setting of couplings 22 and 23, the product of the values of one of the resistor elements and one of the reactive elements is substantially equal to the product of the values of the bridge elements to which they are mechanically connected divided by the square root of six. By way of example, when a balanced condition is to be produced by changing resistors 13 (as considered with respect to the embodiments of FIGS. 1 and 2), then either the values of resistors 28, 29 and 30 may be substantially equal to $(R_{13}\pm\Delta R_{13})$ while the values of capacitors 25, 26 and 27 are substantially equal to $C_{11}/\sqrt{6}$ or the values of resistors 28, 29 and 30 may be substantially equal to $(R_{13}\pm\Delta R_{13})/\sqrt{6}$ while the values of capacitors 25, 26 and 27 are substantially equal to $C_{11}$. The expression for the frequency of the oscillator in the embodiment of FIG. 3 in accordance with the present invention becomes:

$$f=\frac{1}{2\pi C_{11}(R_{13}\pm\Delta R_{13})}$$

which may be rewritten in the form:

$$f=\frac{1}{2\pi C_{11}\sqrt{(R_{13}\pm\Delta R_{13})(R_{13}\pm\Delta R_{13})}}$$

In the embodiment of FIG. 4, capacitors 25, 26 and 27 and resistors 28, 29 and 30 are chosen so that for each setting of couplings 22 and 23, the product of the values of one of the resistors and one of the capacitors is substantially equal to the product of the values of the bridge elements to which they are connected multiplied by the square root of six. The expression for the frequency of the oscillator of this embodiment then becomes the same as that for the oscillator of FIG. 3 as presented in the previous paragraph.

The bridge circuit optimum frequency expression and the oscillator frequency expressions for the embodiments of FIGS. 3 and 4 differ from one another only in that in the former, one of the terms under the square root radical is $R_{13}$ while in the latter it is $(R_{13}\pm\Delta R_{13})$. The frequencies of the oscillators therefore approach the changing optimum frequencies of the bridge circuits as a balanced condition is approached, thereby providing substantially maximum bridge sensitivity.

It should be noted that substantially maximum bridge sensitivity is produced in each of the illustrated embodiments when balance is produced by changing the reactive elements. The proofs are similar to those presented for resistance changes.

Although four embodiment of the invention have been illustrated and described in detail, the invention may take other forms without departing from the spirit and scope of the invention.

What is claimed is:

1. A combination comprising
   a four-arm bridge circuit having resistive type elements in two adjacent arms and reactive type elements of the same type in the other arms, where one of said elements has an unknown value, the element of the other type adjacent thereto is fixed in value and at least one of the remaining elements is adjustable,
   a resistance-reactance tuned oscillator connected across said bridge circuit, said oscillator having in its reactive-resistive frequency determining network reactive elements of the same type as said reactive elements of said bridge circuit and having adjustable said frequency determining network elements of the same type as said bridge circuit adjustable element, and
   mechanical adjusting means each of which interconnects like adjustable elements in said frequency determining network of said oscillator and in said bridge circuit so that all elements of the same type so interconnected change substantially proportionately for each setting of said mechanical adjusting means associated therewith.

2. A combination in accordance with claim 1 in which said reactive elements comprise capacitors.

3. A combination in accordance with claim 1 in which said reactive elements comprise inductors.

4. A combination comprising
   a four-arm bridge circuit having resistive type elements in two adjacent arms and reactive type elements of the same type in the other arms, where one of said elements has an unknown value, the element of the other type adjacent thereto is fixed in value and at least one of the remaining elements is adjustable,
   a Wien bridge oscillator connected across said bridge circuit, said oscillator having in its reactive-resistive frequency determining network reactive elements of the same type as said reactive elements of said bridge circuit and having adjustable said frequency determining network elements of the same type as said bridge circuit adjustable element, and
   mechanical adjusting means each of which interconnects like adjustable elements in said frequency determining network of said oscillator and in said bridge circuit so that all elements of the same type so interconnected have substantially the same value for each setting of said mechanical adjusting means associated therewith.

5. A combination in accordance with claim 4 in which said reactive elements comprise capacitors.

6. A combination in accordance with claim 4 in which said reactive elements comprise inductors.

7. A combination comprising
   a four-arm bridge circuit having resistive type elements in two adjacent arms and reactive type elements of the same type in the other arms, where one of said elements has an unknown value, the element of the other type adjacent thereto is fixed in value and the remaining elements are adjustable,
   a Wien bridge oscillator connected across said bridge circuit, said oscillator having all elements in its reactive-resistive frequency determining network adjustable and further having said network reactive elements of the same type as said reactive elements of said bridge circuit,
   first mechanical adjusting means interconnecting the resistive elements in said frequency determining network of said oscillator and the adjustable resistive element in said bridge circuit so that all resistive elements so interconnected have substantially the same value for each setting of said first mechanical adjusting means, and
   second mechanical adjusting means interconnecting the reactive elements in said frequency determining network of said oscillator and the adjustable reactive element in said bridge circuit so that all reactive elements so interconnected have substantially the same value for each setting of said second mechanical adjusting means.

8. A combination in accordance with claim 7 in which said reactive elements comprise capacitors.

9. A combination in accordance with claim 7 in which said reactive elements comprise inductors.

10. A combination comprising
    a four-arm bridge circuit having resistive type elements in two adjacent arms and reactive type elements of the same type in the other arms, where one of said elements has an unknown value, the element of the other type adjacent thereto is fixed in value and at least one of the remaining elements is adjustable,
    a phase-shift oscillator connected across said bridge circuit, said oscillator having in its reactive-resistive frequency determining network reactive elements of the same type as said reactive elements of said bridge circuit and having adjustable said frequency determining network elements of the same type as said bridge circuit adjustable elements, and
    mechanical adjusting means each of which interconnects like adjustable elements in said frequency determining network of said oscillator and in said bridge circuit so that the values of all elements so interconnected change substantially proportionately for each setting of said mechanical adjusting means associated therewith.

11. A combination in accordance with claim 10 in which said reactive elements comprise capacitors.

12. A combination comprising a four-arm bridge circuit having resistive type elements in two adjacent arms and reactive type elements of the same type in the other arms, where one of said elements has an unknown value, the element of the other type adjacent thereto is fixed in value and the remaining elements are adjustable, a phase-shift oscillator connected across said bridge circuit, said oscillator having all elements in its reactive-resistive frequency determining network adjustable and further having said network reactive elements of the same type as said reactive elements of said bridge circuit, first mechanical adjusting means interconnecting the resistive elements in said oscillator network and the adjustable resistive element in said bridge circuit, and second mechanical adjusting means interconnecting the reactive elements in said oscillator network and the adjustable reactive element in said bridge circuit, all of said network reactive elements having substantially the same value and all of said network resistive elements having substantially the same value for each setting of said first and second adjusting means with the product of the values of one of said network resistive elements and one of said network reactive elements always substantially equal to one over the square root of six times the product of the values of said bridge elements to which they are mechanically connected.

13. A combination in accordance with claim 12 in which said reactive elements comprise capacitors.

14. A combination comprising a four-arm bridge circuit having resistive type elements in two adjacent arms and reactive type elements of the same type in the other arms, where one of said elements has an unknown value, the element of the other type adjacent thereto is fixed in value and the remaining elements are adjustable, a phase-shift oscillator connected across said bridge circuit, said oscillator having all elements in its reactive-resistive frequency determining network adjustable and further having said network reactive elements of the same type as said reactive elements of said bridge circuit, first mechanical adjusting means interconnecting the resistive elements in said oscillator network and the adjustable resistive element in said bridge circuit, and second mechanical adjusting means interconnecting the reactive elements in said oscillator network and the adjustable reactive element in said bridge circuit, all of said network reactive elements having substantially the same value and all of said network resistive elements having substantially the same value for each setting of said first and second adjusting means with the product of the values of one of said network resistive elements and one of said network reactive elements always substantially equal to the square root of six times the product of the values of said bridge elements to which they are mechanically connected.

15. A combination in accordance with claim 14 in which said reactive elements comprise capacitors.

References Cited by the Examiner
UNITED STATES PATENTS

| | | | |
|---|---|---|---|
| 1,442,781 | 1/1923 | Nichols | 325—376 |
| 2,268,872 | 1/1942 | Hewlett | 331—141 |
| 2,648,773 | 8/1953 | Wallace. | |
| 3,218,550 | 11/1965 | Merriam | 324—60 |

WALTER L. CARLSON, *Primary Examiner.*

E. E. KUBASIEWICZ, *Assistant Examiner.*